(12) United States Patent
Fujita

(10) Patent No.: US 8,376,108 B2
(45) Date of Patent: Feb. 19, 2013

(54) MULTIPLE CLUTCH DEVICE

(75) Inventor: Yasuhiko Fujita, Moriyama (JP)

(73) Assignee: EXEDY Corporation, Osaka (JP)

( * ) Notice: Subject to any disclaimer, the term of this patent is extended or adjusted under 35 U.S.C. 154(b) by 931 days.

(21) Appl. No.: 12/446,562

(22) PCT Filed: Nov. 2, 2007

(86) PCT No.: PCT/JP2007/071392
§ 371 (c)(1),
(2), (4) Date: Apr. 21, 2009

(87) PCT Pub. No.: WO2008/062652
PCT Pub. Date: May 29, 2008

(65) Prior Publication Data
US 2010/0320050 A1 Dec. 23, 2010

(30) Foreign Application Priority Data
Nov. 21, 2006 (JP) ................................ 2006-314807

(51) Int. Cl.
*F16D 21/02* (2006.01)
(52) U.S. Cl. .............. 192/48.8; 192/48.619; 192/113.35
(58) Field of Classification Search .................. 192/48.8, 192/70.12, 113.35, 48.601–48.619
See application file for complete search history.

(56) References Cited

U.S. PATENT DOCUMENTS

| 4,006,808 | A | * | 2/1977 | Starling et al. | 192/103 FA |
|---|---|---|---|---|---|
| 5,186,693 | A | * | 2/1993 | Nishida et al. | 475/148 |
| 5,887,690 | A | * | 3/1999 | Haupt | 192/48.611 |
| 6,059,682 | A | * | 5/2000 | Friedmann et al. | 475/159 |
| 6,199,441 | B1 | * | 3/2001 | Kanenobu et al. | 74/331 |
| 6,929,107 | B2 | * | 8/2005 | Hegerath | 192/48.611 |
| 2004/0206599 | A1 | | 10/2004 | Hegerath | |
| 2005/0067251 | A1 | * | 3/2005 | Braford et al. | 192/70.12 |
| 2005/0205373 | A1 | * | 9/2005 | Foster et al. | 192/18 A |
| 2007/0175726 | A1 | * | 8/2007 | Combes et al. | 192/87.11 |

FOREIGN PATENT DOCUMENTS

| JP | S58-157036 | U | 10/1983 |
|---|---|---|---|
| JP | 2000-352431 | A | 12/2000 |
| JP | 2006-177463 | A | 7/2006 |
| JP | 3124493 | U | 7/2006 |
| WO | WO-2005/052402 | A1 | 6/2005 |

* cited by examiner

Primary Examiner — David D Le
Assistant Examiner — Huan Le
(74) Attorney, Agent, or Firm — Global IP Counselors, LLP

(57) ABSTRACT

A multiple clutch device 1 includes a first clutch component 10, a second clutch component 20, a first oil channel 51, and a second oil channel 51. The first clutch component 10 is able to link an input shaft 2 and a first output shaft 3 by frictional engagement. The second clutch component 20 is able to link the input shaft 2 and a second output shaft 4 by frictional engagement. The first oil channel 51 serves to supply lubricating fluid to the first clutch component 10. The second oil channel 52 is substantially independent from the first oil channel 51, and serves to supply lubricating fluid to the second clutch component 20.

19 Claims, 10 Drawing Sheets

MULTIPLE CLUTCH DEVICE

CROSS-REFERENCE TO RELATED APPLICATIONS

This U.S. National stage application claims priority under 35 U.S.C. §119(a) to Japanese Patent Application No. 2006-314807, filed in Japan on Nov. 21, 2006, the entire contents of which are hereby incorporated herein by reference.

TECHNICAL FIELD

The present invention relates to a multiple clutch device, and more particularly relates to a multiple clutch device with which power that is transmitted from an engine through an input shaft is transmitted separately to a first output shaft and a second output shaft that are linked to a transmission.

BACKGROUND OF THE INVENTION

An automatic transmission (AT) is a means for automatically shifting the gears of a vehicle. Most ATs in recent years combine, for example, a torque converter and a plurality of planetary gears and clutches. Because of automatic shifting with a plurality of clutches and the continuously variable shifting of the torque converter, there is no need for the driver to work the clutch upon starting, stopping, or shifting gears, as is necessary with a manual transmission (MT).

However, a torque converter transmits power through a fluid. Accordingly, the power transmission efficiency of an AT is lower than that of an MT, which transmits torque by direct mechanical linkage between the input and output sides. Therefore, an AT has the advantage of reduced fatigue on the driver, but has the drawback of higher fuel consumption for the vehicle.

In view of this, an automated manual transmission (AMT) has been proposed, which is based on the structure of an MT, and which affords the transmission efficiency of an MT while eliminating the need for clutch operation. More specifically, with an AMT, the clutch operation of an MT and the shifting operation of the transmission are automated. An AMT ensures the same transmission efficiency as a conventional MT, while eliminating the need for clutch operation.

However, with an AMT, during a shift the clutch is disengaged just as with an MT. so the transmission of torque is temporarily interrupted. While torque transmission is interrupted, the vehicle continues moving only by momentum, without accelerating. This torque cut-off greatly affects the acceleration performance of the vehicle, and also tends to produce a less comfortable ride for the driver. Meanwhile, with an AT, there is no torque cut-off during shifting because a plurality of clutches is used.

In view of this, it has been proposed that a multiple clutch device be employed as the clutch device of an AMT in order to solve this problem of torque cut-off (see, for example, Japanese Laid-Open Patent Application 2000-352431).

SUMMARY OF THE INVENTION

A conventional multiple clutch device will now be described. FIG. 9 is a simplified diagram of a multiple clutch device 501, and FIG. 10 is a simplified vertical cross section of the area around the clutch mechanism. As shown in FIG. 9, the multiple clutch device 501 is made up of a clutch mechanism 505 and a lubricating system 506 that supplies lubricating oil to the clutch mechanism 505.

As shown in FIG. 10, the multiple clutch device 501 is a device for linking an input shaft 502 to a first output shaft 503 and a second output shaft 504, and mainly comprises a first clutch component 510 and a second clutch component 520. The first clutch component 510 is able to link the input shaft 502 to the first output shaft 503 by frictional engagement. The second clutch component 520 is able to link the input shall 502 to the second output shaft 504 by frictional engagement. The second clutch component 520 is disposed on the outer peripheral side of the first clutch component 510.

With this multiple clutch device 501, power can be transmitted alternately to the first output shaft 503 and the second output shaft 504 by the first clutch component 510 and the second clutch component 520. Consequently, there is no torque cut-off during shifting, which makes possible a shifting operation that is smooth and free of waste.

With the multiple clutch device 501 described above, the lubricating system 506 supplies lubricating oil to the first clutch component 510 and the second clutch component 520 for the purpose of cooling the friction members. More specifically. as shown in FIG. 9, with the lubricating system 506, lubricating oil is supplied to the first clutch component 510 and the second clutch component 520 by a shared oil channel 551. Even more specifically, the pressure of the lubricating oil discharged from an oil pump 557 is adjusted by a pressure valve 556. The pressure-adjusted lubricating oil can be adjusted to either of two different flow amounts (large or small) by a shut-off valve 554 and a throttle plate 553. The flow-adjusted lubricating oil is supplied by the oil channel 551 to the inner peripheral part of the first clutch component 510.

As shown in FIG. 10, the lubricating oil supplied from the oil channel 551 flows through a first opening 512a in a first output member 512 into a first friction linking component 513. The lubricating oil flows to the outer peripheral side while cooling the plurality of friction members that make up the first friction linking component 513, and flows through an opening (not shown) in an input member 530 into a second friction linking component 523. The lubricating oil flows to the outer peripheral side while cooling the plurality of friction members that make up the second friction linking component 523, and is discharged to the outer peripheral side through a second opening 522a in a second output member 522.

Thus, with the conventional multiple clutch device 501, the lubricating oil is supplied to the second clutch component 520 after cooling the first clutch component 510. Accordingly, the temperature of the lubricating oil supplied to the second clutch component 520 is higher, and this lowers the cooling effect of the second clutch component 520 as compared to that of the first clutch component 510. As a result, the service life of the friction members of the second clutch component 520 is shorter.

It is possible to increase the supply amount of lubricating oil to improve the cooling effect on the second clutch component 520.

However, if the supply amount of lubricating oil is increased, this increases the drag torque that is generated when the lubricating oil is dragged along between the friction members in the disengaged clutch component.

Thus, with a conventional multiple clutch device, it is difficult to reduce the generation of drag torque while also improving the effect of cooling friction members.

It is an object of the present invention to reduce the generation of drag torque and to improve the effect of cooling friction members in a multiple clutch device having a lubricating system.

A multiple clutch device according to a first aspect of the present invention is a device with which power transmitted from an engine through an input shaft is separately transmitted to a first output shaft and a second output shaft linked to a transmission. The device has a first clutch component, a second clutch component, a first oil channel, and a second oil channel. The first clutch component is capable of linking the input shaft and the first output shaft by friction engagement. The second clutch component is capable of linking the input shaft and the second output shaft by friction engagement. The first oil channel supplies lubricating fluid to the first clutch component. The second oil channel is substantially independent of the first oil channel, and supplies lubricating fluid to the second clutch component.

With this multiple clutch device, having the first oil channel and second oil channel be independent allows lubricating fluid of the same temperature to be supplied to the first clutch component and the second clutch component. As a result, the second clutch component can be cooled just as effectively as the first clutch component.

Also, making the first oil channel and second oil channel independent allows the amounts in which the lubricating fluid is supplied to the first clutch component and second clutch component to be adjusted separately. As a result, adjusting the amount supplied to one clutch component will not affect the generation of drag torque in the other clutch component.

Thus, with this multiple clutch device, the generation of drag torque can be reduced while the cooling of the friction members can be enhanced.

The phrase "substantially independent" as used here encompasses a case in which the first oil channel and second oil channel are completely independent, as well as a case in which the first oil channel and second oil channel communicate to the extent that there is no effect on the cooling of the first clutch component and second clutch component.

A multiple clutch device according to a second aspect of the present invention is the multiple clutch device of the first aspect, wherein the first and second clutch components share an input member that is linked to the input shaft. The input member has a third oil channel through which flows the lubricating fluid discharged from the first clutch component. and a fourth oil channel, which is included in the second oil channel and through which flows the lubricating fluid that flows to the second clutch component.

Consequently, two independent oil channels can be achieved with a simple structure.

A multiple clutch device according to a third aspect of the present invention is the multiple clutch device of the second aspect, wherein the first clutch component has an input member, a first output member that is linked to the first output shaft, and a first friction linking component that is disposed on the inner peripheral side of the input member and is able to link the input member and the first output member by frictional engagement. The second clutch component has an input member, a second output member that is linked to the second output shaft, and a second friction linking component that is disposed on the inner peripheral side of the input member and is able to link the input member and the second output member by frictional engagement. The third oil channel connects the region where the first friction linking component is disposed and the region other than the region where the second friction linking component is disposed. The fourth oil channel connects the region where the first friction linking component is disposed and the region where the second friction linking component is disposed.

In this case, lubricating oil can be supplied with independent oil channels to the first friction linking component and the second friction linking component.

A multiple clutch device according to a fourth aspect of the present invention is the multiple clutch device of the second or third aspect, wherein the input member has a first annular component that mutually non-rotatably engages the first friction linking component, and a second annular component that is fixed on the outer peripheral side of the first annular component and mutually non-rotatably engages the second friction linking component. The third oil channel and/or the fourth oil channel is formed by combining the first annular component and the second annular component.

In this case, a third oil channel and a fourth oil channel can be achieved with a simple structure.

A multiple clutch device according to a fifth aspect of the present invention is the multiple clutch device of any one of the second to fourth aspects, wherein the third oil channel and the fourth oil channel are disposed superposed in the axial direction.

A multiple clutch device according to a sixth aspect of the present invention is the multiple clutch device of any one of the first to fifth aspects, further comprising an oil pump that supplies the lubricating fluid to the first oil channel and second oil channel, a first adjuster that is provided to the first oil channel and adjusts the amount of lubricating fluid supplied from the oil pump to the first clutch component, and a second adjuster that is provided to the second oil channel and adjusts the amount of lubricating fluid supplied from the oil pump to the second clutch component.

A multiple clutch device according to a seventh aspect of the present invention is the multiple clutch device of the sixth aspect. wherein the first adjuster is able to adjust the supplied amount of lubricating fluid in at least two stages, and the second adjuster is able to adjust the supplied amount of lubricating fluid in at least two stages.

A multiple clutch device according to an eighth aspect of the present invention is the multiple clutch device of the third aspect, wherein at least part of the first oil channel is formed between the input shaft and the first output member. At least part of the second oil channel is formed between the first output member and the second output member.

DETAILED DESCRIPTION OF THE PREFERRED EMBODIMENTS

Embodiments of the present invention will now be described through reference to the drawings.

1. Overall Configuration of Multiple Clutch Device

Figure 1:
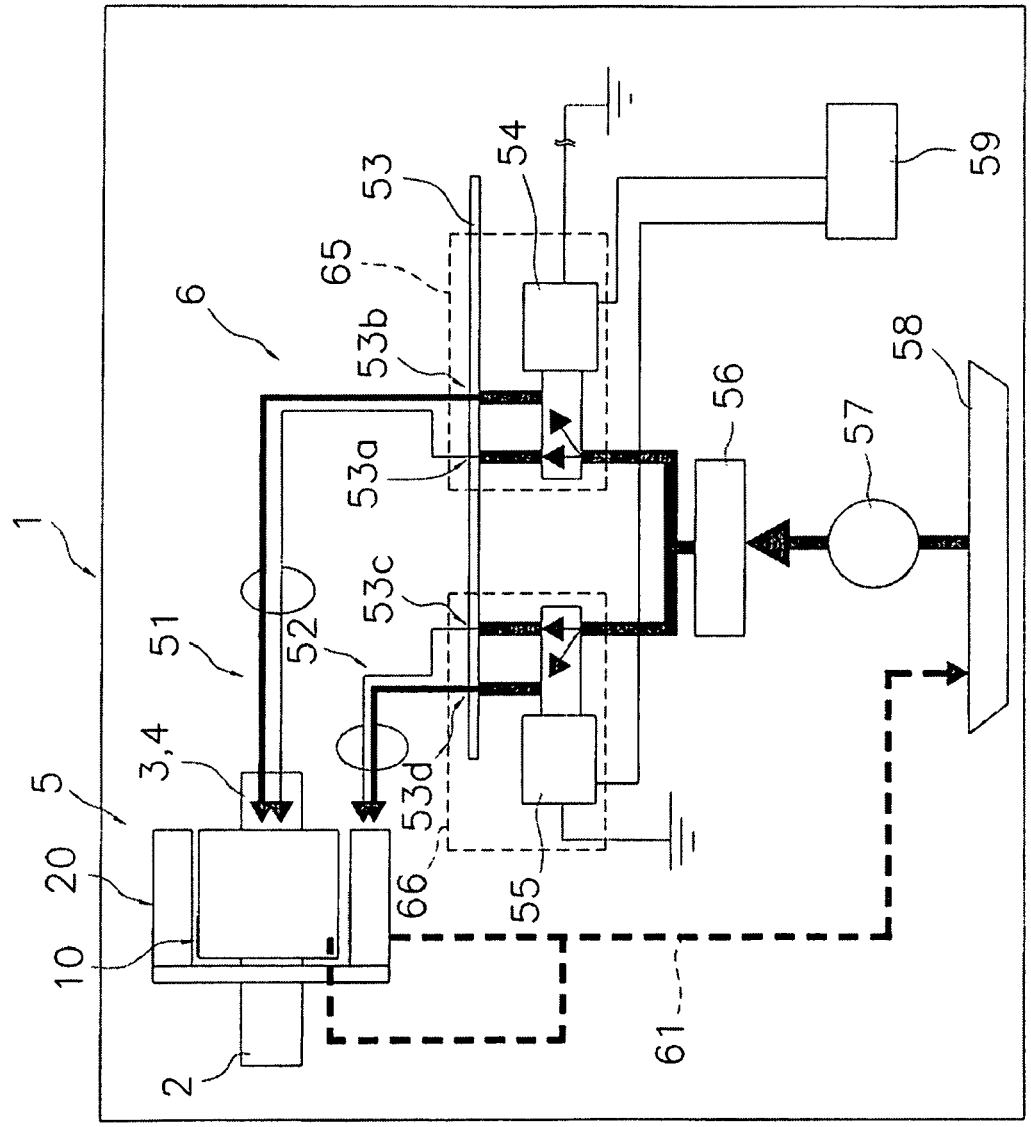
FIG. 1 is a simplified diagram of a multiple clutch device pertaining to an embodiment of the present invention.
Figure 2:
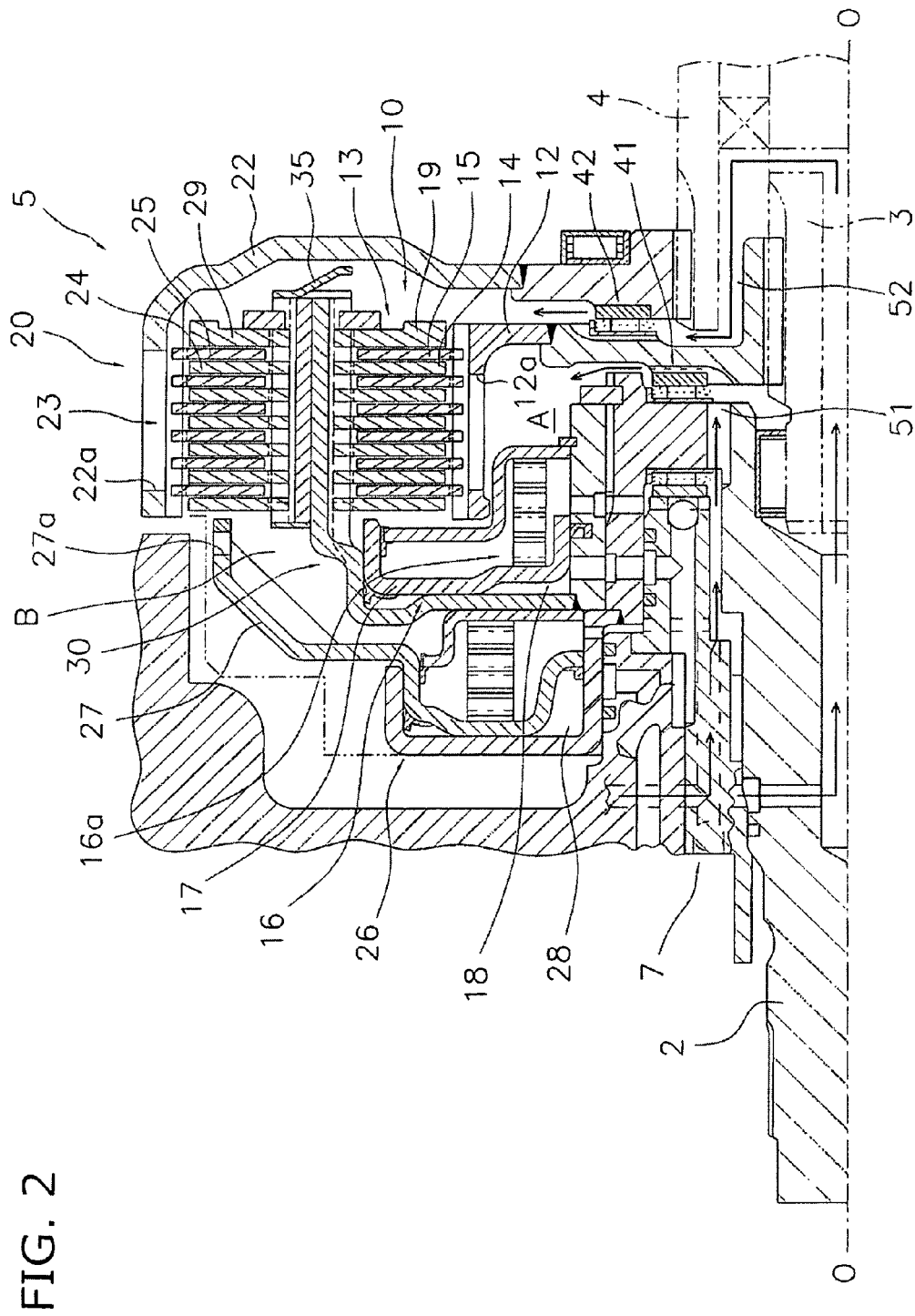
FIG. 2 is a simplified vertical cross section of the area around the clutch mechanism.
Figure 3:
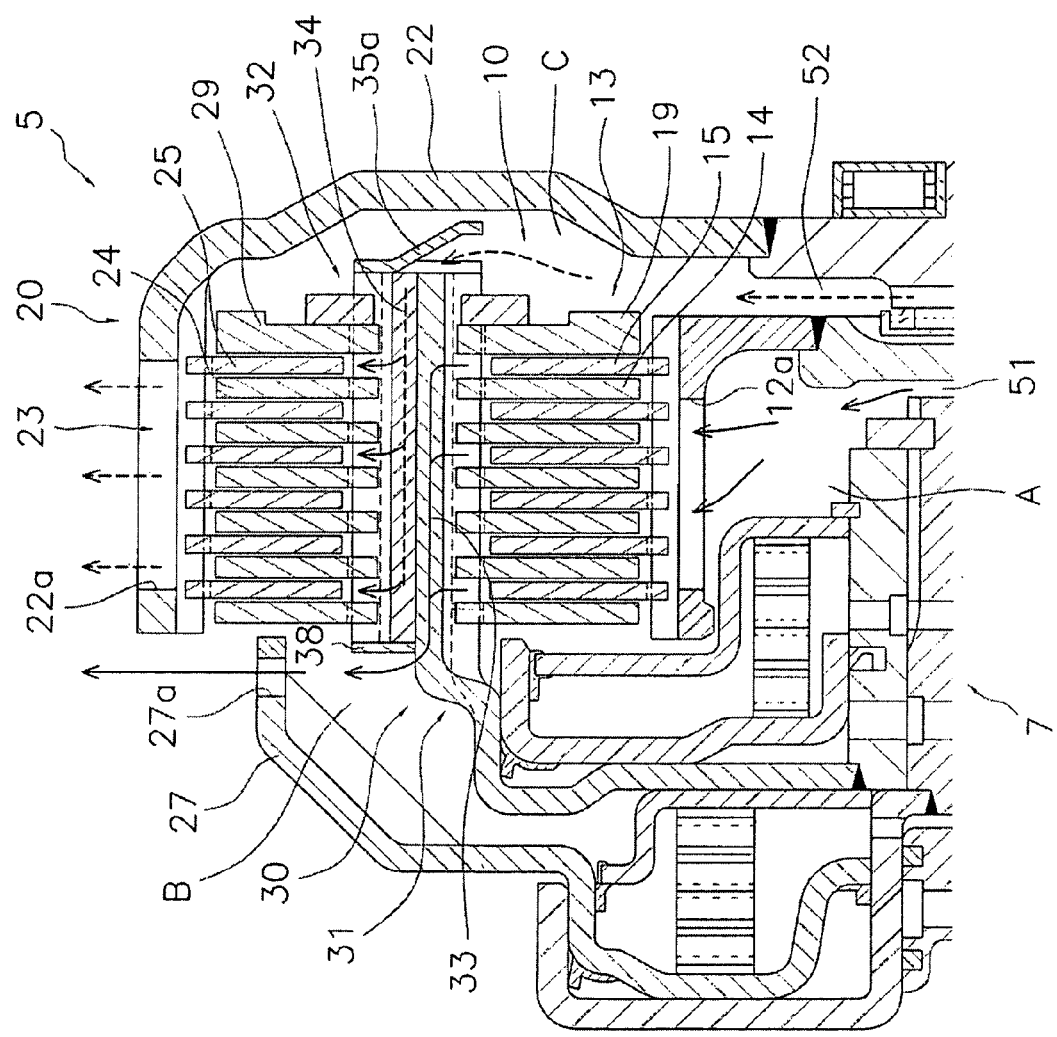
FIG. 3 is a partial cross section of the clutch mechanism.

FIG. 1 is a simplified diagram of a multiple clutch device 1 pertaining to an embodiment of the present invention. FIG. 2 is a simplified vertical cross section of the area around the clutch mechanism. FIG. 3 is a partial cross section of a clutch mechanism. In FIGS. 2 and 3, the engine is disposed on the left side and the transmission on the right side. The O-O line in FIG. 2 is the rotational center of a clutch mechanism 5.

The multiple clutch device 1 is a device with which an input shaft 2 to which power from an engine (not shown) is transmitted is separately linked to a first output shaft 3 and a second output shaft 4. More specifically, as shown in FIG. 1, the multiple clutch device I mainly comprises the clutch mechanism 5, which has a clutch function, and a lubricating system 6, which supplies lubricating oil to the clutch mechanism 5 via a first oil channel 51 and a second oil channel 52. The first output shaft 3 and the second output shaft 4 transmit power to the transmission (not shown).

(1) Clutch Mechanism

As shown in FIGS. 1 to 3, the clutch mechanism 5 main comprises a :first clutch component 10 that is able to link the input shaft 2 and the first output shaft 3 by frictional engagement, and a second clutch component 20 that is able to link the input shaft 2 and the second output shaft 4 by frictional engagement. An oil guide 7, in the interior of which are formed a plurality of oil channels, is fixed on the outer peripheral side of the input shaft 2. The main part of the clutch mechanism 5 is disposed on the outer peripheral side of the oil guide 7.

As shown in FIG. 2, the first clutch component 10 mainly comprises an input member 30 linked to the input shaft 2, a first output member 12 linked to the first output shaft 3, a first friction linking component 13 that is able to link the input member 30 and the first output member 12 by frictional engagement, and a first biasing force generation mechanism 16 for imparting a biasing force to the first friction linking component 13.

The first friction linking component 13 has a plurality of first input friction plates 14 provided mutually non-rotatably and movably in the axial direction to the input member 30, a plurality of first output friction plates 15 provided mutually non-rotatably and movably in the axial direction to the first output member 12, and a first end plate 19.

The first biasing force generation mechanism 16 has a first piston 17 provided movably in the axial direction to the input member 30, and a first oil chamber 18 formed between the input member 30 and the first piston 17.

As shown in FIG. 2, the second clutch component 20 mainly comprises the input member 30 linked to the input shaft 2. a second output member 22 linked to the second output shaft 4, a second friction linking component 23 that is able to link the input member 30 and the second output member 22 by frictional engagement, and a second biasing force generation mechanism 26 that imparts biasing force to the second friction linking component 23.

The second friction linking component 23 has a plurality of second input friction plates 24 provided mutually non-rotatably and movably in the axial direction to the input member 30, a plurality of second output friction plates 25 provided mutually non-rotatably and movably in the axial direction to the second output member 22, and a second end plate 29.

The second biasing force generation mechanism 26 has a second piston 27 provided movably in the axial direction to the input member 30, and a second oil chamber 28 formed between the input member 30 and the second piston 27. A plurality of third holes 27a that pass through in the radial direction are formed on the transmission-side portion of the second piston 27.

A plurality of first openings 12a that pass through in the radial direction are formed in the first output member 12. The first openings 12a are disposed on the inner peripheral side of the first friction linking component 13. A plurality of second openings 22a that pass through in the radial direction are formed in the second output member 22. The second openings 22a are disposed on the outer peripheral side of the second friction linking component 23.

Also, a first thrust bearing 41 is disposed in the axial direction between the first output member 12 and the oil guide 7. A second thrust bearing 42 is disposed in the axial direction between the first output member 12 and the second output member 22. The first thrust bearing 41 and the second thrust bearing 42 are disposed within the first oil channel 51 and the second oil channel 52, and allow the lubricating oil to pass through in the axial direction.

An annular region A is formed on the inner peripheral side of the first friction linking component 13 (more specifically, on the inner peripheral side of the portion of the first output member 12 where the first openings 12a are formed). The region A constitutes part of the first oil channel 51. An annular region B is formed between the second piston 27 and the input member 30 on the engine side of the second friction linking component 23. The region B is the region other than the region where the second friction linking component 23 is disposed, and communicates with a third oil channel 33 (discussed below). An annular region C is formed on the transmission side of the first friction linking component 13 (more specifically, between the first end plate 19 and the second output member 22). The region C constitutes part of the second oil channel 52, and communicates with a first oil channel 34 (discussed below). The region C is the region other than the region where the first friction linking component 13 is disposed.

(2) Lubricating System

As shown in FIG. 1, the lubricating system 6 mainly comprises an oil pump 57 that discharges a lubricating oil, a pressure valve 56 that adjusts the pressure of the lubricating oil, a first adjuster 65 that adjusts the amount of lubricating oil supplied to the first clutch component 10, and a second adjuster 66 that adjusts the amount of lubricating oil supplied to the second clutch component 20. The output-side route of the pressure valve 56 splits into the first oil channel 51 and the second oil channel 52. The first adjuster 65 is provided at a point along the first oil channel 51, and the second adjuster 66 is provided at a point along the second oil channel 52.

The first adjuster 65 comprises a first valve 54 that can be switched in two directions, and a throttle plate 53 that is connected to two ports of the first valve 54 and has two kinds of throttle holes. The second adjuster 66 comprises a second valve 55 that can be switched in two directions, and the throttle plate 53 that is connected to two ports of the second valve 55 and has two kinds of throttle holes.

The first valve 54 can switch between a first state and a second state, and the second valve 55 can also switch between a first state and a second state. A first small diameter hole 53a, a first large diameter hole 53b, a second small diameter hole 53c. and a second large diameter hole 53d are formed as the four throttle holes in the throttle plate 53. The first small diameter hole 53a and the first large diameter hole 53b make up part of the first oil channel 51, and the second small diameter hole 53c and the second large diameter hole 53d make up part of the second oil channel 52. When the first valve 54 is in its first state, the outlet of the pressure valve 56 and the first small diameter hole 53a are connected, and when the first valve 54 is in its second state, the outlet of the pressure valve 56 and the first large diameter hole 53b are connected. When the second valve 55 is in its first state, the outlet of the pressure valve 56 and the second small diameter hole 53c are connected, and when the second valve 55 is in its second state, the outlet of the pressure valve 56 and the second large diameter hole 53d are connected. The switching of the first valve 54 and the second valve 55 is controlled by a controller 59.

Also, an oil pan 58 is provided on the intake side of the oil pump 57. Lubricating oil that has passed through the first clutch component 10 and the second clutch component 20 goes through a discharge oil channel 61 (FIG. 1) back to the oil pan 58, and is again supplied by the oil pump 57 to the pressure valve 56.

With the above configuration, the amount in which the lubricating oil is supplied to the first clutch component 10 can be adjusted to either of two different flow amounts (large or small) by switching the first valve 54. The amount in which the lubricating oil is supplied to the second clutch component 20 can be adjusted to either of two different flow amounts (large or small) by switching the second valve 55. Specifically, with this lubricating system 6, the amounts in which lubricating oil is supplied to the first clutch component 10 and the second clutch component 20 can be adjusted separately.

(3) Input Member

Figure 4A:
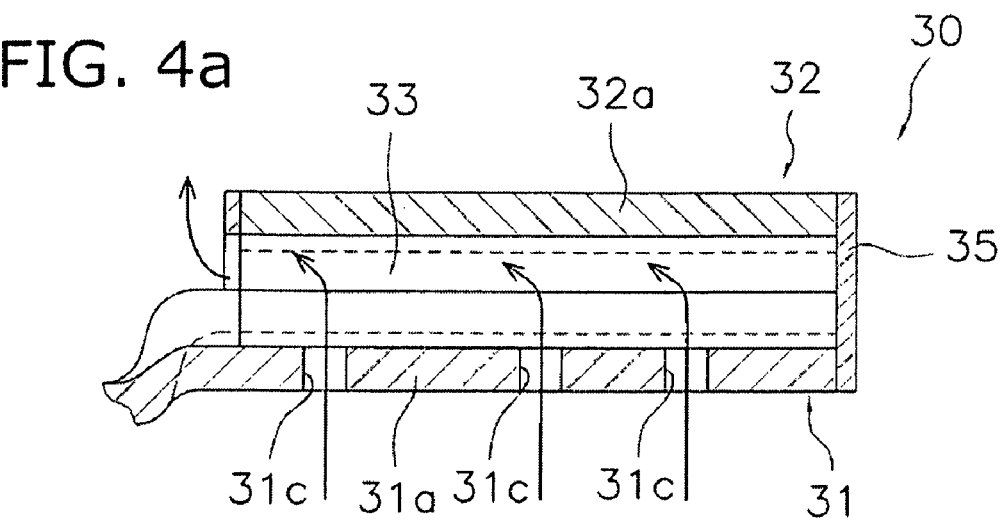
FIGS. 4a and 4b are partial cross sections of an input member (cross section in a plane including the rotational axis)
Figure 4B:
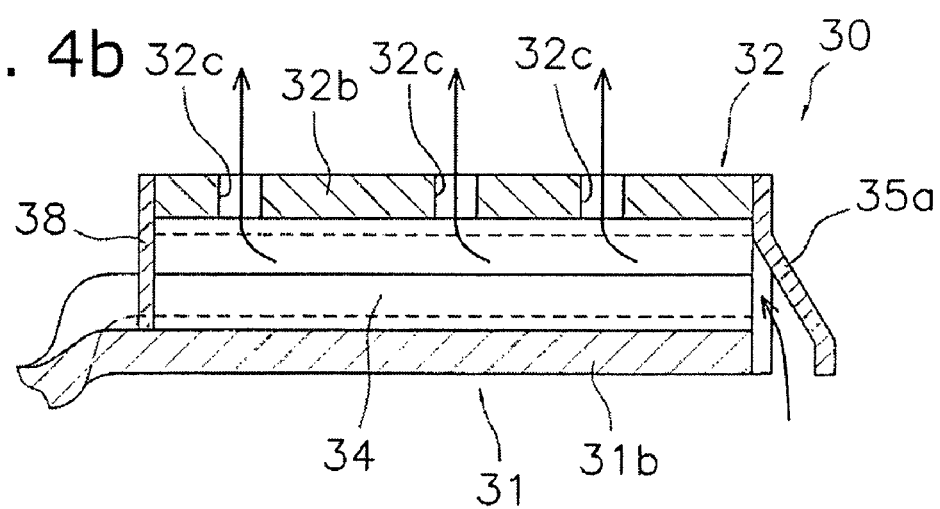
Figure 5:
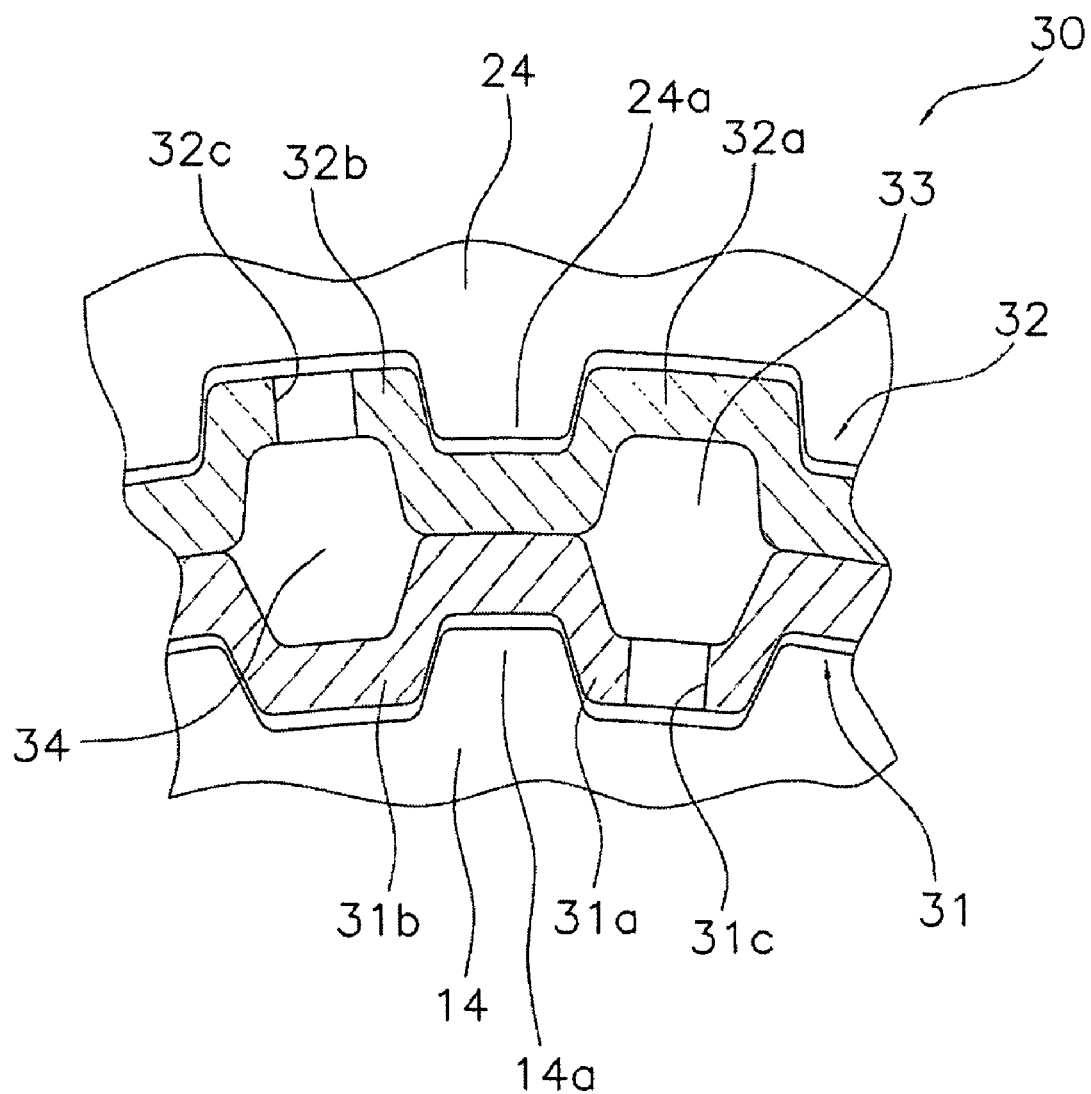
FIG. 5 is a partial cross section of an input member (cross section in a plane perpendicular to the rotational axis)

The configuration of the clutch mechanism 5 (and particularly the configuration of the area around the input member 30) differs from that in the past so that the lubricating oil supplied to the first oil channel 51 and the second oil channel 52 flows by separate routes to the first clutch component 10 and the second clutch component 20. The configuration of the area around the input member 30 will now be described in more detail through reference to FIGS. 3 to 5. FIGS. 4a and 4b are partial cross sections of an input member (cross section in a plane including the rotational axis), and FIG. 5 is a partial cross section of an input member (cross section in a plane perpendicular to the rotational axis). FIG. 4a corresponds to the third oil channel 33, and FIG. 4b to the first oil channel 34.

As shown in FIG. 3, the input member 30 functions as an oil channel in addition to its function of transmitting power from the input shaft 2 to the first friction linking component 13 and the second friction linking component 23. More specifically, the input member 30 mainly comprises a first member 31 that is fixed to a member on the input shaft 2 side, a second member 32 that is fixed to the outer peripheral part of the first member 31, a first plate 35, and a second plate 38. The input member 30 also has a plurality of third oil channels 33 through which flows the lubricating oil that has passed through the first friction linking component 13, and a plurality of fourth oil channels 34 that are included in the second oil channel 52 and through which lubricating oil flows to the second friction linking component 23. Specifically, the third oil channels 33 and the fourth oil channels 34 are formed by combining the first member 31. the second member 32, the first plate 35. and the second plate 38.

As shown in FIGS. 4a, 4b, and 5, the outer peripheral part of the first member 31 is bent in a wavy shape. More specifically, the first member 31 has a plurality of first protrusions 31a and 31b that protrudes inward in the radial direction. The first protrusions 31a and first protrusions 31b are disposed alternating in the circumferential direction. A plurality of first holes 31 aligned in the axial direction is formed in the first protrusions 31a. The first protrusions 31a and 31b extend in the axial direction. The plurality of first protrusions 31a and 31b meshes with outer peripheral teeth 14a formed on the outer peripheral side of the first input friction plates 14.

Just as with the first member 31, the second member 32 is bent in a wavy shape. More specifically, the second member 32 has a plurality of second protrusions 32a and 32b that protrudes outward in the radial direction. The second protrusions 32a and second protrusions 32b are disposed alternating in the circumferential direction. A plurality of second holes 32c aligned in the axial direction is formed in the second protrusions 32a. The second protrusions 32a and 32b extend in the axial direction. The plurality of second protrusions 32a and 32b meshes with inner peripheral teeth 24a formed on the inner peripheral side of the second input friction plates 24.

As shown in FIGS. 4a, 4b, and 5, the first protrusions 31a and the second protrusions 32a are opposite one another in the radial direction, and the first protrusions 31b and the second protrusions 32b are opposite one another in the radial direction. Also, the portions between the first protrusions 31a and 31b and the portions between the second protrusions 32a and 32b are fixed in a state of being in contact by spot welding or the like. Because of how these are configured, a plurality of oil channels is formed extending in the axial direction. These oil channels constitute part of the third oil channels 33 and the fourth oil channels 34.

Also, as shown in FIG. 4a, the annular first plate 35 is fixed on the transmission side of the first protrusions 31a and the second protrusions 32a. The first plate 35 prevents the lubricating oil that flows in through the first holes 31c from flowing out to the transmission side through these oil channels (the oil channels formed by the first protrusions 31a and the second protrusions 32a). As shown in FIG. 4b, the first plate 35 has a flow adjuster 35a disposed on the transmission side of the second protrusions 32b. The flow adjuster 35a makes it easier for the lubricating oil flowing outward in the radial direction through the region C between the first output member 12 and the second output member 22 to flow into the fourth oil channels 34. Further, as shown in FIG. 4b, the second plate 38 is fixed on the engine side of the first protrusions 31b and the second protrusions 32b. The second plate 38 prevents the lubricating oil that has flowed into the fourth oil channels 34 from flowing out to the engine side.

To summarize the above configuration, the input member 30 has a plurality of third oil channels 33 and a plurality of fourth oil channels 34 that are mutually independent and are disposed alternating in the circumferential direction. The third oil channels 33 are formed from the first holes 31c up to the engine-side end of the first protrusions 31a and the second protrusions 32a, and connect the region in which the first friction linking component 13 is formed with the region other than the region where the second friction linking component 23 is disposed. The fourth oil channels 34 are formed from the transmission-side end of the first protrusions 31 b and the second protrusions 32b up to the second holes 32c, and connect the region other than the region where the first friction linking component 13 is disposed with the region where the second friction linking component 23 is disposed.

The result of the above configuration is that with this clutch mechanism 5, the lubricating oil that has passed through the first friction linking component 13 is discharged through the third oil channels 33 to the region on the engine side of the second friction linking component 23 (the region other than the region where the second friction linking component 23 is disposed). The lubricating oil that has been supplied to the second oil channel 52 flows reliably through the fourth oil channels 34 to the second friction linking component 23. As a result, the lubricating oil supplied to one friction linking component does not pass through the other friction linking component. Consequently, the first friction linking component 13 and the second friction linking component 23 can be cooled more efficiently.

With the lubricating system 6, the first oil channel 51 and the second oil channel 52 are substantially independent. Accordingly, adjustment of the amount of lubricating oil supplied to one clutch component does not affect the generation of drag torque in the other clutch component.

The phrase "substantially independent" as used here encompasses a case in which the first oil channel 51 and second oil channel 52 are completely independent, as well as a case in which the first oil channel 51 and second oil channel 52 communicate to the extent that there is no effect on the cooling of the first clutch component 10 and second clutch component 20. For example, as shown in FIG. 2, a region A, which is part of the first oil channel 51, and a region C, which is part of the second oil channel 52, communicate via gaps between the first input friction plates 14, the first output friction plates 15, the first output member 12, etc. However, these gaps are far smaller than the region A or region C, so resistance is higher when the lubricating oil flows through. Accordingly, almost no lubricating oil flows between the region A and the region C, and this flows is believed to have no effect on the cooling of the first clutch component 10 and second clutch component 20. This situation is also encompassed by a configuration in which the first oil channel 51 and the second oil channel 52 are substantially independent.

2. Operation (1) Operation of Clutch Mechanism

The operation of the clutch mechanism 5 will be described through reference to FIG. 2. When the first clutch component 10 is linked, hydraulic pressure is supplied to the first oil chamber 18 via an oil channel. The first piston 17 biases the first input friction plates 14 in the axial direction with the biasing force generated by the hydraulic pressure. As a result, the first input friction plates 14 and the first output friction plates 15 are frictionally engaged: The frictional force generated between the plates 14 and 15 causes the first output member 12 and the first friction linking component 13 to rotate integrally. Consequently, power inputted to the input shaft 2 is transmitted through the first clutch component 10 to the first output shaft 3.

Meanwhile, when the first clutch component 10 is unlinked, the supply of hydraulic pressure to the first oil chamber 18 is halted. As a result, the biasing force from a first elastic. mechanism 16a presses the first piston 17 to the transmission side in the axial direction. Consequently, the frictional linking of the first friction linking component 13 is released, and transmission of torque to the first output shaft 3 is cut off.

The operation of the second clutch component 20 is the same as the operation of the first clutch component 10 discussed above, and will therefore not be described in detail.

The linking of first clutch component 10 and the second clutch component 20 can be controlled as above. Accordingly, power can be alternately transmitted to the first output shaft 3 and the second output shaft 4. Smooth shifting, with no waste and no torque interruption, can be achieved by switching the transmission through these operations.

(2) Operation of Lubricating System

Next, the operation of the lubricating system 6 will be described through reference to FIGS. 1 to 3. As shown in FIG. 1, the lubricating oil discharged from the oil pump 57 is adjusted to the desired pressure by the pressure valve 56. The pressure-adjusted lubricating oil flows into the first adjuster 65 and the second adjuster 66. For example, if the first valve 54 of the first adjuster 65 is switched to its first state, the outlet of the pressure valve 56 is connected to the first small diameter hole 53a. The first small diameter hole 53a reduces the amount of lubricating oil supplied to the first clutch component 10 through the first oil channel 51. If the first valve 54 is switched to its second state, the outlet of the pressure valve 56 is connected to the first large diameter hole 53b. The first large diameter hole 53b allows a larger amount of lubricating oil to be supplied to the first clutch component 10 than in the first state.

Thus, with this lubricating system 6, the lubricating oil going to the first oil channel 51 and the second oil channel 52 can be supplied in two stages (small or large amount). The operation of the second adjuster 66 is the same as that of the first adjuster 65, and will therefore not be described in detail.

(3) Flow of Lubricating Oil in Clutch Mechanism

The flow of lubricating oil in the clutch mechanism 5 will now be described through reference to FIGS. 2 and 3.

As shown in FIGS. 2 and 3, the lubricating oil whose flow amount has been adjusted by the first adjuster 65 is supplied through the first oil channel 51 to the first clutch component 10. More specifically, the flow-adjusted lubricating oil goes through the oil channel in the oil guide 7, passes through the first thrust bearing 41 in the axial direction. and flows into the region A on the inner peripheral side of the first output member. 12. This lubricating oil flows outward in the radial direction, and flows through the first openings 12a in the first output member 12 into the first friction linking component 13.

The lubricating oil that has flowed into the first friction linking component 13 flows outward in the radial direction between the first input friction plates 14 and the first output friction plates 15, and flows through the third oil channels 33 of the input member 30 (see FIG. 4a) into the region B on the engine side of the second friction linking component 23. The majority of this lubricating oil does not flow into the second friction linking component 23, and instead is discharged through the space between the second friction linking component 23 and the second piston 27 or the plurality of third holes 27a to the outer peripheral side of the multiple clutch device 1, and returns through the discharge oil channel 61 to the oil pan 58.

As shown in FIGS. 2 and 3, the lubricating oil whose flow has been adjusted by the second adjuster 66 is supplied through the second oil channel 52 to the second clutch component 20. More specifically, the flow-adjusted lubricating oil goes through the oil channel in the oil guide 7, passes through the second thrust bearing 42 in the axial direction, and flows into the region C on the transmission side of the second output member 22. The majority of this lubricating oil flows into the fourth oil channels 34 (see FIG. 4b) formed in the input member 30 by means of the flow adjuster 35a. The lubricating oil that has flowed into the second friction linking component 23 flows outward in the radial direction between the second input friction plates 24 and the second output friction plates 25, is discharged through the second openings 22a to the outer peripheral side of the multiple clutch device 1. and returns through the discharge oil channel 61 to the oil pan 58.

As described above, since the third oil channels 33 are formed in the input member 30, almost none of the lubricating oil supplied to the first oil channel 51 flows into the second friction linking component 23. Also, since the fourth oil channels 34 are formed in the input member 30, almost none of the lubricating oil supplied to the second oil channel 52 flows into the second friction linking component 23, and instead reliably flows into the first friction linking component 13.

(4) Operation of Multiple Clutch Device

Figure 6:
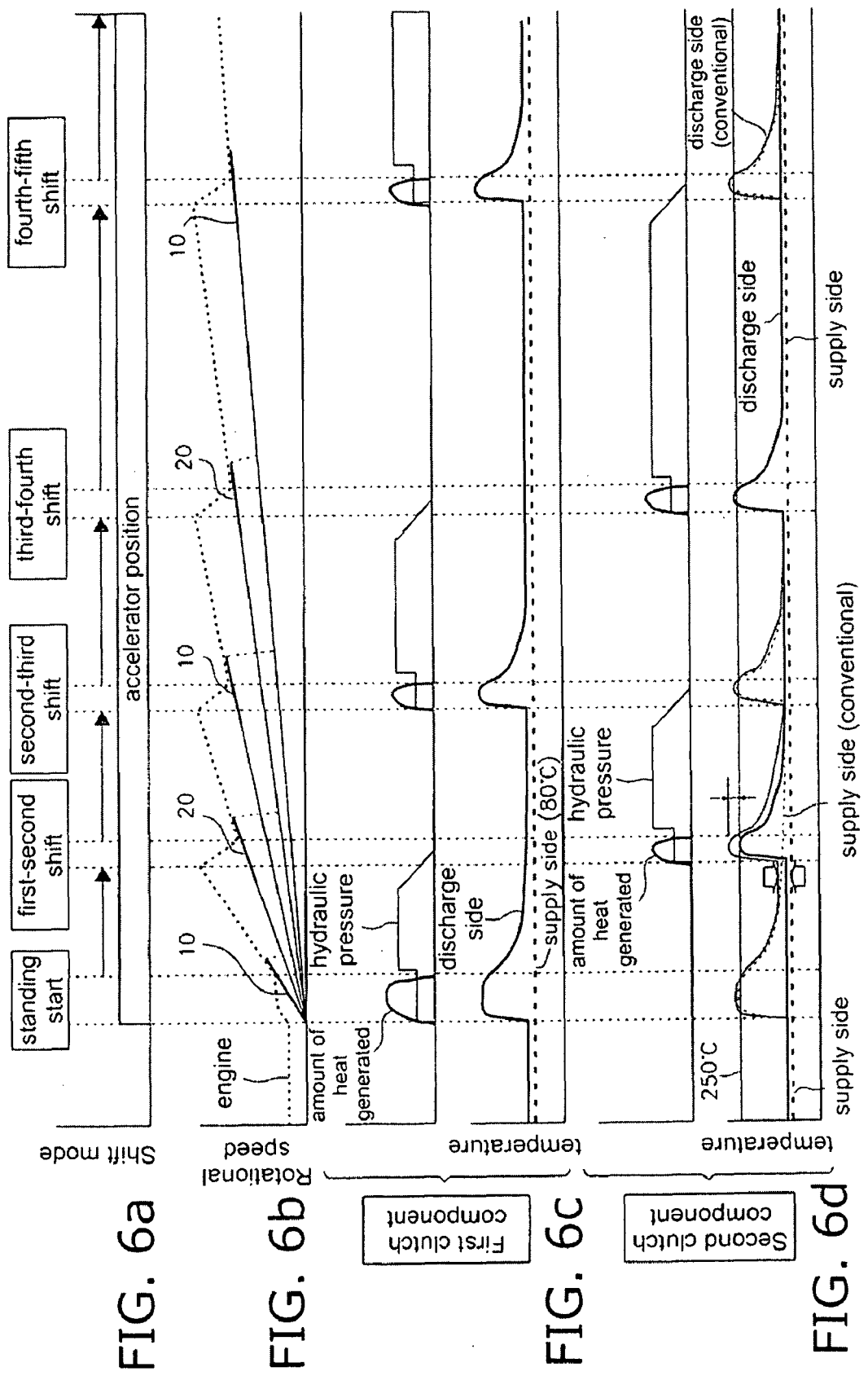
FIGS. 6a-6d are diagrams of the operation of the multiple clutch device.
Figure 7:
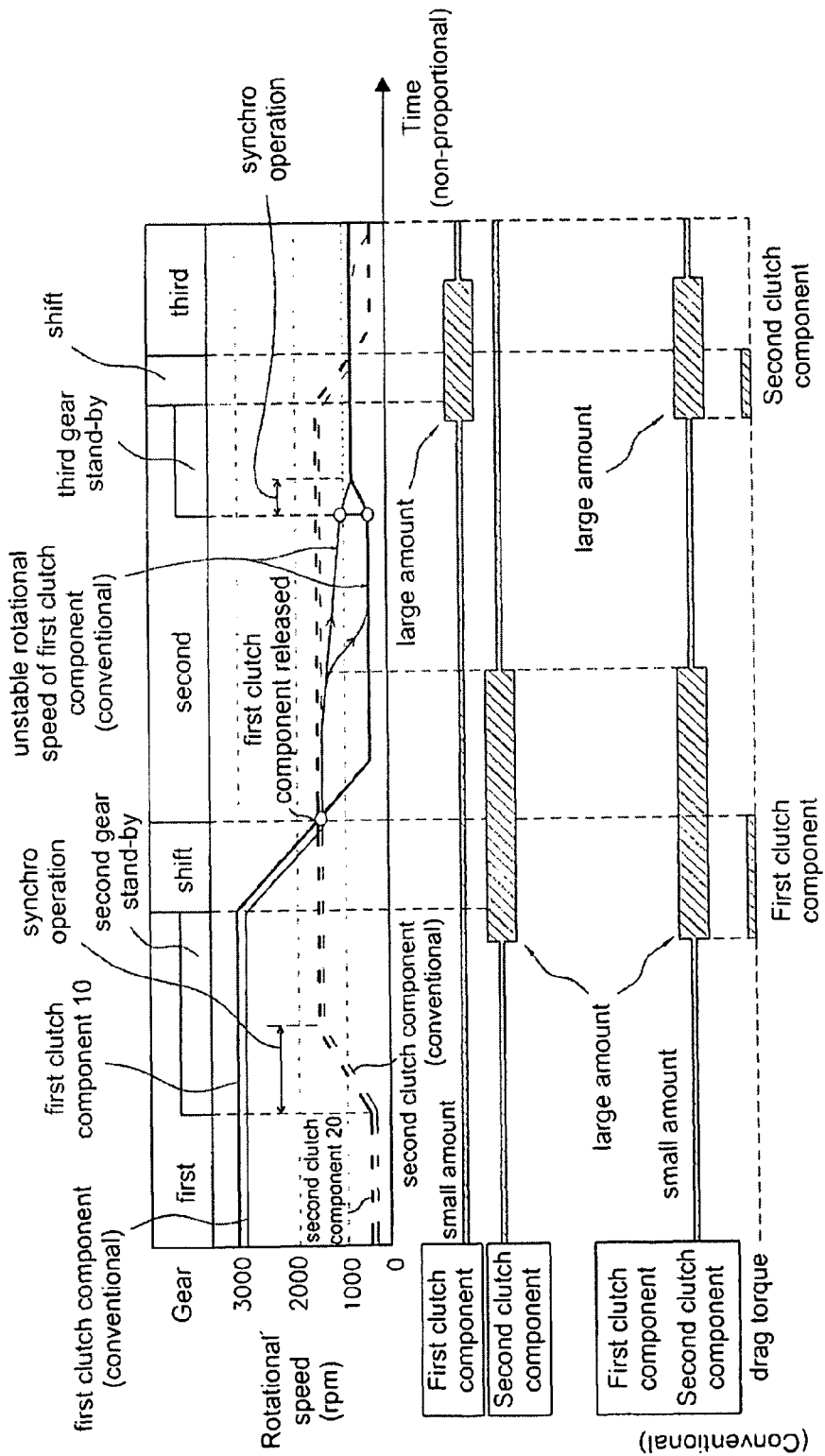
FIG. 7 is a diagram of the operation of a lubricating system during shifting (during a shift from first to second gear, and during a shift from second to third gear)

The operation of a multiple clutch device will now be described through reference to FIGS. 6a-7, and referring to the operation of the various components described above. FIG. 6a-6d are diagrams of the operation of the multiple clutch device 1, and FIG. 7 is a diagram of the operation of the lubricating system 6 during shifting (during a shift from first to second gear, and during a shift from second to third gear). FIG. 6a shows the shift mode and accelerator position, FIG. 6b shows the change in the rotational speed of various components.

FIG. 6c shows the change in the amount of heat generated in the first clutch component 10. and FIG. 6d shows the change in lubricating oil temperature, the change in clutch hydraulic pressure, and the change in the amount of heat generated in the second clutch component 20. In this embodiment, in first, third, and fifth gear, the first clutch component 10 is in its engaged state and the second clutch component 20 is in its disengaged state. In second and fourth gear, the second clutch component 20 is in its engaged state and the first clutch component 10 is in its disengaged state.

As shown in FIG. 6, from a standing start, during a shift from second to third gear, and during a shift from fourth to fifth gear, the first clutch component 10 is engaged and frictional heat is generated in the first clutch component 10. During a shift from first to second gear, and during a shift from third to fourth gear, the second clutch component 20 is engaged, and frictional heat is generated in the second clutch component 20. To cool the friction members of the first clutch component 10 and the second clutch component 20 (more specifically, the first input friction plates 14, the first output friction plates 15, the second input friction plates 24, and the second output friction plates 25), lubricating oil is supplied from the lubricating system 6 when the first clutch component 10 and the second clutch component 20 are engaged.

Figure 9:
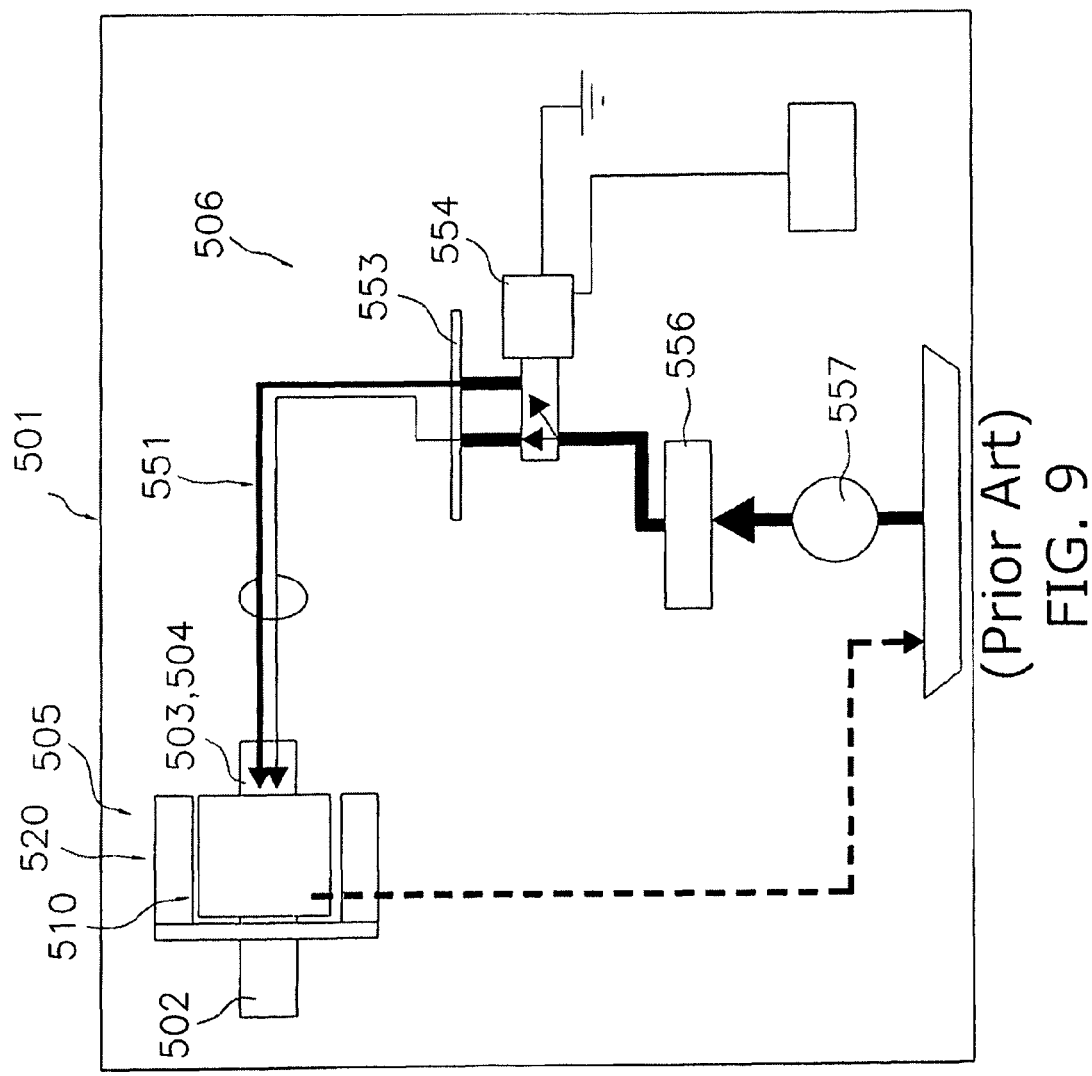
FIG. 9 is a simplified diagram of a conventional multiple clutch device.
Figure 10:
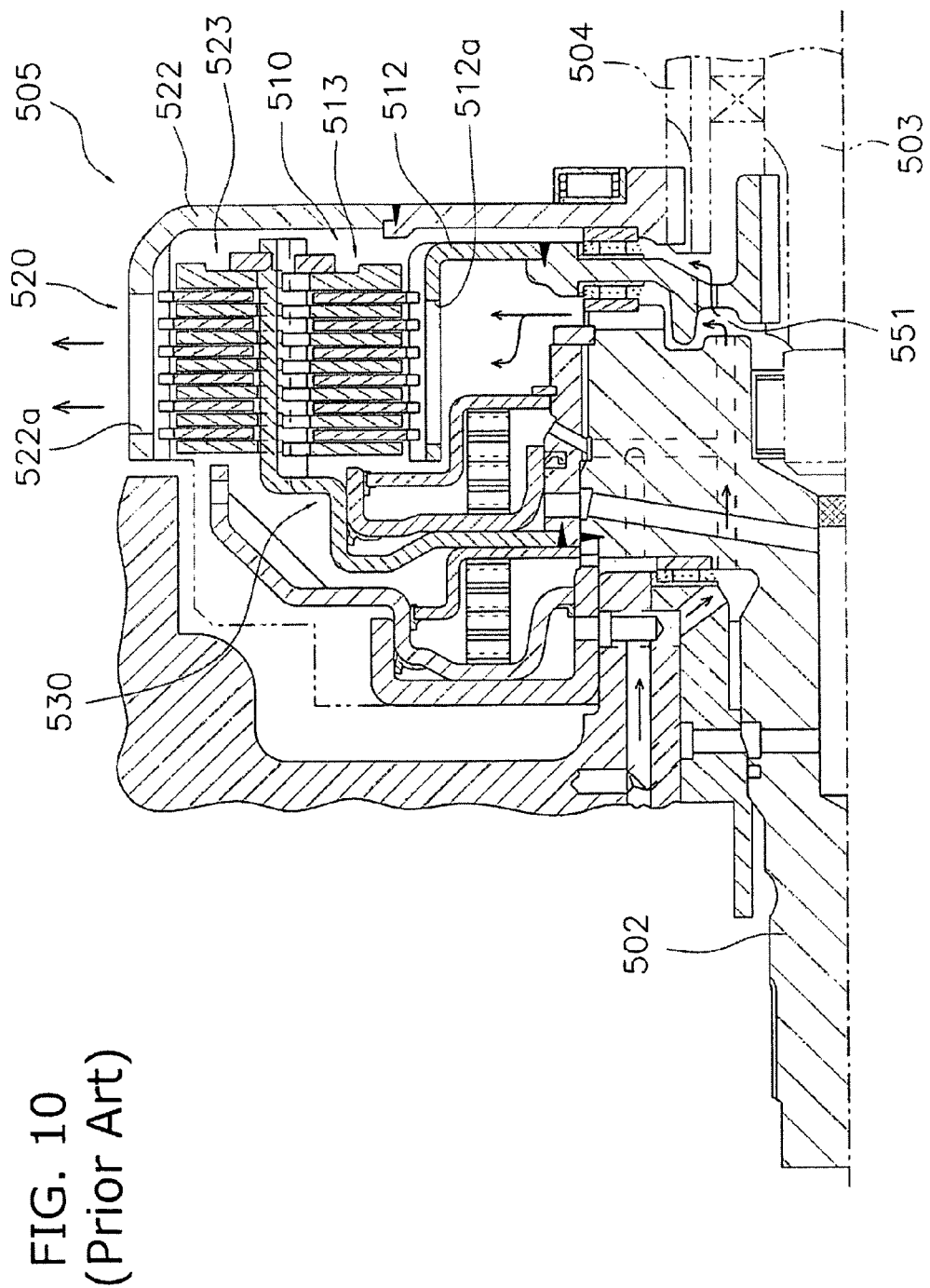
FIG. 10 is a simplified vertical cross section of an area around a conventional clutch mechanism.

The situation with a conventional multiple clutch device will now be described. As shown in FIGS. 9 and 10, with the conventional multiple clutch device 501, the lubricating oil supply channel is shared by the first clutch component 510 and the second clutch component 520. Accordingly, lubricating oil that has passed through the first clutch component 510 flows into the second clutch component 520. As a result, as shown in FIG. 6d, as the lubricating oil temperature rises on the discharge side of the first clutch component 510, the lubricating oil temperature also rises on the supply side of the second clutch component 520. Consequently, during a shift from first to second, if frictional heat is generated in the second clutch component 520, the lubricating oil temperature on the discharge side of the second clutch component 520 goes over the upper limit (250 degrees, for example), and rises up to about 270 degrees, for example. Specifically, with the conventional multiple clutch device 501, since lubricating oil is supplied via the first clutch component 510 to the second clutch component 520, the desired cooling effect is not obtained in the second clutch component 520.

However, with this multiple clutch device 1, since the first oil channel 51 and the second oil channel 52 are substantially independent as discussed above, even if the lubricating oil temperature rises on the discharge side of the first clutch component 10, the lubricating oil temperature does not rise on the supply side of the second clutch component 20. That is, lubricating oil can be supplied at substantially the same temperature to both the first clutch component 10 and the second clutch component 20. Consequently, the cooling efficiency at the second clutch component 20 is higher than in the past, and the desired cooling effect can be obtained.

For example, as shown in FIG. 7, when driving in first gear, a small amount of lubricating oil is supplied to the first clutch component 10 and the second clutch component 20. During a shift from first to second gear, the second clutch component 20 is engaged at substantially the same time as the first clutch component 10 is disengaged. During this clutch engagement operation, a large quantity of lubricating oil is supplied from the second adjuster 66 to the second clutch component 20 via the second oil channel 52. Here, the switching of the second valve 55 of the second adjuster 66 is performed at a timing that is slightly earlier than the timing at which hydraulic pressure is supplied to the second oil chamber 28 of the second clutch component 20. This timing is determined by counting backward from the timing of the shift from first to second gear, for example. The second valve 55 is switched after a specific length of time has elapsed since the completion of the engagement operation of the second clutch component 20. As a result, the amount of lubricating oil supplied from the second adjuster 66 to the second clutch component 20 is returned to a small amount.

Thus, during a shift from first to second gear, the second friction linking component 23 of the second clutch component 20 (more specifically, the second input friction plates 24 and the second output friction plates 25) are cooled by lubricating oil that has been supplied directly, without going through the first friction linking component 13. Consequently, this prevents a rise in the temperature of the second friction linking component 23.

As shown in FIG. 7, with the conventional multiple clutch device 501, during a shift from first to second gear, if there is an increase in the amount of lubricating oil supplied, drag torque occurs in the first clutch component 510 or the second clutch component 520.

However, with this multiple clutch device 1, since the first oil channel 51 and the second oil channel 52 are substantially independent, there is almost no change in how much lubricating oil is supplied to the first clutch component 10 even though there is an increase in how much lubricating oil is supplied to the second clutch component 20. Accordingly, there is less drag torque in the first clutch component 10 and second clutch component 20 than in the past.

Also, as shown in FIG. 7, with the conventional multiple clutch device 501, the rotational speed of the first clutch component 510 became unstable due to drag torque during shifting (more specifically, the first output member 512 and the first output shaft 503 are dragged along and their rotational speed does not decrease to the proper level). Accordingly, when third gear is engaged with the first clutch component 510 for a shift from second to third gear, the synchromesh mechanism may be subjected to an unintended shock.

However, with this multiple clutch device 1, there is less drag torque in the first clutch component 10 during a shift from first to second gear. Accordingly, the rotational speed of the first clutch component 10 is stable, and the engagement of third gear is smoother. Consequently, with this multiple clutch device 1, transmission problems attributable to the occurrence of drag torque can be eliminated.

3. Additional Description of Cooling Effect

Figure 8:
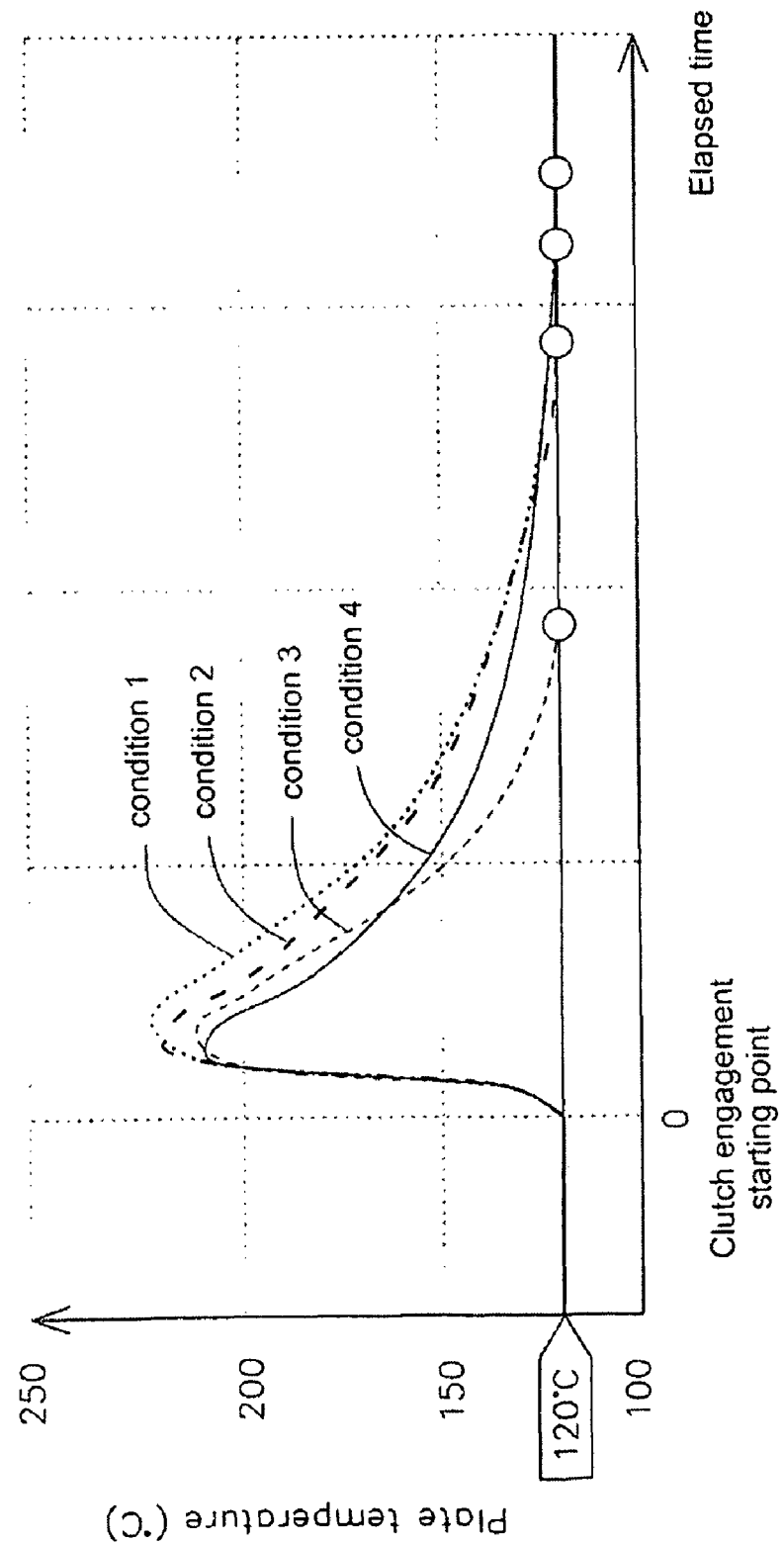
FIG. 8 is a graph of the relationship between cooling time and the temperature of the friction member.

The above-mentioned cooling effect will now be described further through reference to FIG. 8. FIG. 8 is a graph of the relationship between cooling time and the temperature of the friction member. The vertical axis shows the temperature change in the friction member. and the horizontal axis shows the cooling time.

The inventors conducted an experiment to see what effect the amount of lubricating oil and the surface area of the friction member have on cooling time. Conditions 1 to 3 here that assume the amount of lubricating oil to be the same, and the surface area of the friction member is either small, medium, or large. Under condition 4, the surface area of the friction member is large, and the lubricating oil amount is greater than under conditions 1 to 3.

It can be seen from FIG. 8 that at a given amount of lubricating oil, the time it takes to cool to 120 degrees is substantially the same even at different surface areas for the friction member, and more specifically, it takes about 30 seconds. It can also be seen from FIG. 8 that at a given surface area for the friction member, the required cooling time is shorter when the lubricating oil amount increases.

Based on the above results, with the lubricating system 6, the specified time from the completion of the engagement of the second clutch component 20 until the second valve 55 is switched is set, for example, to between 20 and 30 seconds.

4. Action and Effect

As described above, with this multiple clutch device 1, since the first oil channel 51 and the second oil channel 52 are substantially independent, lubricating fluid of substantially the same temperature can be supplied to both the first clutch component 10 and the second clutch component 20. Accordingly, this improves the cooling of the first friction linking component 13 and the second friction linking component 23. Also. since the first oil channel 51 and the second oil channel 52 are substantially independent, the amounts in which the lubricating fluid is supplied to the first clutch component 10 and the second clutch component 20 can be adjusted separately. Accordingly, the occurrence of drag torque in the clutch components in a disengaged state can be reduced.

Also, the first clutch component 10 and the second clutch component 20 share the input member 30, which has the third oil channels 33 and the fourth oil channels 34. Accordingly, the two substantially independent first oil channel 51 and second oil channel 52 can be achieved with a simple structure.

Furthermore, the third oil channels 33 connect the region where the first friction linking component 13 is disposed and the region other than the region where the second friction linking component 23 is disposed. The fourth oil channels 34 connect the region other than the region where the first friction linking component 13 is disposed and the region where the second friction linking component 23 is disposed. Consequently, lubricating oil can be supplied to the first friction linking component 13 and the second friction linking component 23 with the first oil channel 51 and the second oil channel 52, respectively.

As discussed above, with this multiple clutch device 1, the occurrence of drag torque can be reduced while friction member cooling is enhanced.

5. Other Embodiments

The present invention is not limited to the embodiment given above, and various modifications and improvements are possible without departing from the scope of the present invention.

In the above embodiment, the' first adjuster 65 and the second adjuster 66 are able to adjust the flow in two stages, but the first adjuster 65 and second adjuster 66 may instead be flow control valves that linearly adjust the flow.

Industrial Applicability

The occurrence of drag torque can be reduced while the cooling of the friction members can be improved by providing two substantially independent oil channels. Therefore, the present invention is useful in the field of power transmission devices.

What is claimed is:

1. A multiple clutch device with which power transmitted from an engine through an input shaft is separately transmitted to a first output shaft and a second output shaft linked to a transmission, the multiple clutch device comprising:
   a first clutch component being configured to link the input shaft and the first output shaft by friction engagement;
   a second clutch component being configured to link the input shaft and the second output shaft by friction engagement;
   a first oil channel being configured to supply lubricating fluid to the first clutch component; and
   a second oil channel being substantially independent of the first oil channel, and being configured to supply lubricating fluid to the second clutch component,
   the first and second clutch components sharing an input member that is linked to the input shaft,
   the lubricating fluid including first lubricating fluid and second lubricating fluid,
   the input member having a third oil channel through which the first lubricating fluid discharged from the first clutch component flows, and a fourth oil channel through which the second lubricating fluid flows to the second clutch component,
   the first lubricating fluid being discharged from the first clutch component at a first opening,
   the second lubricating fluid being discharged from the second clutch component at a second opening,
   the first lubricating fluid between the first oil channel and the first opening being not mixed with the second lubricating fluid.

2. The multiple clutch device according to claim 1, wherein the third oil channel and the fourth oil channel are disposed superposed in the axial direction.

3. The multiple clutch device according to claim 1, wherein the third oil channel and the fourth oil channel are disposed to overlap with each other in the axial direction.

4. The multiple clutch device according to claim 1, wherein
   the input member has a first annular component that mutually non-rotatably engages the first friction linking component, and a second annular component that is fixed on the outer peripheral side of the first annular component and mutually non-rotatably engages the second friction linking component, and
   at least one of the third oil channel and the fourth oil channel is formed by combining the first annular component and the second annular component.

5. The multiple clutch device according to claim 4, wherein the third oil channel and the fourth oil channel are disposed superposed in the axial direction.

6. The multiple clutch device according to claim 1, further comprising
   an oil pump that supplies the lubricating fluid to the first oil channel and second oil channel,
   a first adjuster that is provided to the first oil channel and adjusts the amount of lubricating fluid supplied from the oil pump to the first clutch component, and
   a second adjuster that is provided to the second oil channel and adjusts the amount of lubricating fluid supplied from the oil pump to the second clutch component.

7. The multiple clutch device according to claim 6, wherein
   the first adjuster is configured to adjust the supplied amount of lubricating fluid in at least two stages, and
   the second adjuster is configured to adjust the supplied amount of lubricating fluid in at least two stages.

8. The multiple clutch device according to claim 1, further comprising
    an oil pump that supplies the lubricating fluid to the first oil channel and second oil channel,
    a first adjuster that is provided to the first oil channel and adjusts the amount of lubricating fluid supplied from the oil pump to the first clutch component, and
    a second adjuster that is provided to the second oil channel and adjusts the amount of lubricating fluid supplied from the oil pump to the second clutch component.

9. The multiple clutch device according to claim 8, wherein
    the first adjuster is configured to adjust the supplied amount of lubricating fluid in at least two stages, and
    the second adjuster is configured to adjust the supplied amount of lubricating fluid in at least two stages.

10. The multiple clutch device according to claim 1, wherein
    the first clutch component has the input member, a first output member that is linked to the first output shaft, and a first friction linking component that is disposed on the inner peripheral side of the input member and is configured to link the input member and the first output member by frictional engagement,
    the second clutch component has the input member, a second output member that is linked to the second output shaft, and a second friction linking component that is configured to link the input member and the second output member by frictional engagement, the input member being configured between the first and second friction linking components,
    the third oil channel connects the region where the first friction linking component is disposed and the region other than the region where the second friction linking component is disposed, and
    the fourth oil channel connects the region where the first friction linking component is disposed and the region where the second friction linking component is disposed.

11. The multiple clutch device according to claim 10, wherein
    at least part of the first oil channel is formed between the input shaft and the first output member, and
    at least part of the second oil channel is formed between the first output member and the second output member.

12. The multiple clutch device according to claim 10, wherein the third oil channel and the fourth oil channel are disposed superposed in the axial direction.

13. The multiple clutch device according to claim 10, further comprising
    an oil pump that supplies the lubricating fluid to the first oil channel and second oil channel,
    a first adjuster that is provided to the first oil channel and adjusts the amount of lubricating fluid supplied from the oil pump to the first clutch component, and
    a second adjuster that is provided to the second oil channel and adjusts the amount of lubricating fluid supplied from the oil pump to the second clutch component.

14. The multiple clutch device according to claim 10, wherein
    the input member has a first annular component that mutually non-rotatably engages the first friction linking component, and a second annular component that is fixed on the outer peripheral side of the first annular component and mutually non-rotatably engages the second friction linking component, and
    at least one of the third oil channel and the fourth oil channel is formed by combining the first annular component and the second annular component.

15. The multiple clutch device according to claim 14, further comprising
    an oil pump that supplies the lubricating fluid to the first oil channel and second oil channel,
    a first adjuster that is provided to the first oil channel and adjusts the amount of lubricating fluid supplied from the oil pump to the first clutch component, and
    a second adjuster that is provided to the second oil channel and adjusts the amount of lubricating fluid supplied from the oil pump to the second clutch component.

16. The multiple clutch device according to claim 15, wherein
    the first adjuster is configured to adjust the supplied amount of lubricating fluid in at least two stages, and
    the second adjuster is configured to adjust the supplied amount of lubricating fluid in at least two stages.

17. The multiple clutch device according to claim 14, wherein the third oil channel and the fourth oil channel are disposed superposed in the axial direction.

18. The multiple clutch device according to claim 17, further comprising
    an oil pump that supplies the lubricating fluid to the first oil channel and second oil channel,
    a first adjuster that is provided to the first oil channel and adjusts the amount of lubricating fluid supplied from the oil pump to the first clutch component, and
    a second adjuster that is provided to the second oil channel and adjusts the amount of lubricating fluid supplied from the oil pump to the second clutch component.

19. The multiple clutch device according to claim 18, wherein
    the first adjuster is configured to adjust the supplied amount of lubricating fluid in at least two stages, and
    the second adjuster is configured to adjust the supplied amount of lubricating fluid in at least two stages.

* * * * *